(12) United States Patent
Orihashi et al.

(10) Patent No.: US 8,415,063 B2
(45) Date of Patent: Apr. 9, 2013

(54) FUEL CELL SYSTEM

(75) Inventors: Nobuyuki Orihashi, Toyota (JP);
Tsunemasa Nishida, Toyota (JP);
Hitoshi Hamada, Gotenba (JP); Kenichi Tokuda, Miyoshi (JP); Junji Nakanishi, Kasugai (JP); Tsutomu Ochi, Miyoshi (JP); Shinji Matsuo, Kiyosu (JP);
Takahiro Nitta, Nishio (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/747,716

(22) PCT Filed: Dec. 2, 2008

(86) PCT No.: PCT/JP2008/071838
§ 371 (c)(1),
(2), (4) Date: Jun. 11, 2010

(87) PCT Pub. No.: WO2009/078269
PCT Pub. Date: Jun. 25, 2009

(65) Prior Publication Data
US 2010/0266915 A1    Oct. 21, 2010

(30) Foreign Application Priority Data
Dec. 14, 2007    (JP) .................. 2007-323091

(51) Int. Cl.
*H01M 8/04* (2006.01)
(52) U.S. Cl. ......... 429/429; 429/443; 429/444; 429/446
(58) Field of Classification Search ........... 429/400–535
See application file for complete search history.

(56) References Cited

U.S. PATENT DOCUMENTS

| | | | |
|---|---|---|---|
| 2004/0067399 A1 | 4/2004 | Kobayashi et al. |
| 2006/0088742 A1 | 4/2006 | Kotani et al. |
| 2008/0008921 A1 | 1/2008 | Miura |
| 2009/0104502 A1 | 4/2009 | Igarashi et al. |

FOREIGN PATENT DOCUMENTS

| JP | 2002-373682 A | 12/2002 |
|---|---|---|
| JP | 2004-139984 A | 5/2004 |
| JP | 2004-259535 A | 9/2004 |
| JP | 2005-203143 A | 7/2005 |
| JP | 2005-327596 A | 11/2005 |
| JP | 2006-073427 A | 3/2006 |
| JP | 2006-127830 A | 5/2006 |
| JP | 2006-209996 A | 8/2006 |
| JP | 2006-228528 A | 8/2006 |
| JP | 2006-252920 A | 9/2006 |
| JP | 2006-253005 A | 9/2006 |

(Continued)

*Primary Examiner* — Basia Ridley
*Assistant Examiner* — James Lee
(74) *Attorney, Agent, or Firm* — Kenyon & Kenyon LLP

(57) ABSTRACT

A fuel cell system includes a fuel cell, anode gas pressure adjusting means that adjusts the pressure of an anode gas supplied to the fuel cell, and cathode gas pressure adjusting means that adjusts the pressure of a cathode gas supplied to the fuel cell. The system further includes pressure control means that sets the pressure of the anode gas that is supplied when starting the fuel cell higher than the pressure of the anode gas that is supplied during power generation in the fuel cell, and controls the anode gas pressure adjusting means and the cathode gas pressure adjusting means so that a cathode gas pressure increase is started in accordance with the start of an anode gas pressure increase when the pressure of the anode gas is increased to the set pressure.

3 Claims, 2 Drawing Sheets

FOREIGN PATENT DOCUMENTS

| | | |
|---|---|---|
| JP | 2006-339080 A | 12/2006 |
| JP | 2007-026891 A | 2/2007 |
| JP | 2007-048575 A | 2/2007 |
| JP | 2007-059348 A | 3/2007 |
| JP | 2007-157449 A | 6/2007 |
| JP | 2007-179825 A | 7/2007 |
| WO | WO 2006/024933 A2 | 3/2006 |
| WO | WO 2008/093147 A2 | 8/2008 |

FUEL CELL SYSTEM

This is a 371 national phase application of PCT/JP2008/071838 filed 02 Dec. 2008, claiming priority to Japanese Patent Application No. JP 2007-323091 filed 14 Dec. 2007, the contents of which are incorporated herein by reference.

TECHNICAL FIELD

The present invention relates to technology that prevents an abnormal electric potential in a fuel cell system.

BACKGROUND ART

In general, a fuel cell includes a membrane-electrode assembly that includes a pair of electrodes (an anode electrode and a cathode electrode) that sandwich two sides of an electrolyte membrane therebetween, and a pair of fuel cell separators that sandwich two sides of the membrane-electrode assembly therebetween. The anode electrode has an anode-electrode catalyst layer and a diffusion layer. The cathode electrode has a cathode-electrode catalyst layer and a diffusion layer. At the time of power generation in the fuel cell, when hydrogen gas is used as an anode gas supplied to the anode electrode and oxygen gas is used as a cathode gas supplied to the cathode electrode, a reaction occurs that generates hydrogen ions and electrons on the anode electrode side. The hydrogen ions pass through the electrolyte membrane to the cathode electrode side, while the electrons arrive at the cathode electrode through an external circuit. On the cathode electrode side, the hydrogen ions, electrons, and oxygen gas react to generate moisture and discharge energy.

Normally, since the cathode electrode side of a fuel cell communicates with the atmosphere, air from the atmosphere enters into the cells of the fuel cell when power generation is stopped. In some cases, the air that had entered may move from the cathode electrode side to the anode electrode side through the electrolyte membrane. There are also fuel cells that supply oxygen gas to the anode electrode side to stop power generation in the fuel cell, and discharge hydrogen gas that is inside the anode electrode.

As described above, when an anode gas such as hydrogen gas is supplied to a fuel cell in a state in which air (oxygen gas) exists in the anode electrode, a state occurs at the anode electrode in which the anode gas and air are unevenly distributed. As a result, a local battery is formed at a portion where the anode gas is unevenly distributed, while at a portion where the air is unevenly distributed, the current flows in the opposite direction to the direction at the time of normal power generation. Consequently, the electric potential of the fuel cell may become an abnormal potential and corrode the cathode electrode, to thereby lower the power generation performance of the fuel cell.

For example, Patent Document 1 proposes a fuel cell system in which the pressure of an anode gas supplied when starting the fuel cell is set to a higher pressure than the pressure of an anode gas supplied during power generation in the fuel cell. According to the fuel cell system disclosed in Patent Document 1, because an anode gas is supplied at a high pressure to the anode electrode when starting the fuel cell, uneven distribution of air inside the anode electrode can be suppressed, thus inhibiting the occurrence of an abnormal electric potential.

However, according to the fuel cell system disclosed in Patent Document 1, because a high-pressure anode gas is supplied to the anode electrode, there is a large difference between the gas pressure at the anode electrode and the gas pressure at the cathode electrode, and therefore an electrolyte membrane that is sandwiched between the anode electrode and the cathode electrode may be damaged.

Further, for example, Patent Document 2 proposes a fuel cell system in which a pressure difference between the gas pressure of an anode electrode and the gas pressure of a cathode electrode is controlled to less than or equal to a predetermined value, although in this case the pressure difference is not caused by starting a fuel cell. According to the fuel cell system disclosed in Patent Document 2, since a pressure difference between gases at an anode electrode and a cathode electrode can be maintained at less than or equal to a predetermined value, damage to an electrolyte membrane can be suppressed.

Patent Document 1: Japanese Patent Laid-Open Publication No. 2004-139984
Patent Document 2: Japanese Patent Laid-Open Publication No. 2002-373682

DISCLOSURE OF THE INVENTION

Problems to be Solved by the Invention

It is an advantage of the present invention to provide a fuel cell system that can suppress the occurrence of an abnormal electric potential in a fuel cell when starting the fuel cell, and also suppress damage to an electrolyte membrane.

Means for Solving the Problems (1) The present invention provides a fuel cell system including a fuel cell, anode gas pressure adjusting means that adjusts a pressure of an anode gas supplied to the fuel cell, and cathode gas pressure adjusting means that adjusts a pressure of a cathode gas supplied to the fuel cell; the fuel cell system further including pressure control means that sets a pressure of an anode gas that is supplied when starting the fuel cell to a pressure that is higher than a pressure of an anode gas that is supplied during power generation in the fuel cell, and controls the anode gas pressure adjusting means and the cathode gas pressure adjusting means so that a cathode gas pressure increase is started in accordance with a start of an anode gas pressure increase when the pressure of the anode gas is increased to the set pressure.

(2) The present invention also provides a fuel cell system including a fuel cell, anode gas pressure adjusting means that adjusts a pressure of an anode gas supplied to an anode electrode of the fuel cell, and cathode gas pressure adjusting means that adjusts a pressure of a cathode gas supplied to a cathode electrode of the fuel cell; the fuel cell system further including: estimating means that estimates a gas amount inside the anode electrode; and pressure control means that sets a pressure of an anode gas that is supplied when starting the fuel cell in accordance with a gas amount that is estimated by the estimating means, and controls the anode gas pressure adjusting means and the cathode gas pressure adjusting means so that a cathode gas pressure increase is started in accordance with a start of an anode gas pressure increase when the pressure of the anode gas is increased to the set pressure.

(3) In the fuel cell system according to the above described (1) or (2), preferably the fuel cell includes an electrolyte membrane, and an anode electrode and a cathode electrode that sandwich the electrolyte membrane therebetween; and the pressure control means controls at least either one of the anode gas pressure adjusting means and the cathode gas pressure adjusting means so that a pressure difference between a pressure of an anode gas that is supplied when starting the fuel cell and a pressure of a cathode gas that is supplied when starting the fuel cell does not exceed a pressure damage threshold value of the electrolyte membrane.

(4) In the fuel cell system according to the above described (2), preferably the estimating means estimate a gas amount in the anode electrode based on at least either one of a stopped time period of the fuel cell or a temperature of the fuel cell.

Advantages of the Invention

The fuel cell system according to the present invention includes pressure control means that set the pressure of an anode gas supplied when starting a fuel cell higher than the pressure of the anode gas supplied during power generation in the fuel cell and also control anode gas pressure adjusting means and cathode gas pressure adjusting means so that a cathode gas pressure increase is started in accordance with the start of an anode gas pressure increase when the pressure of the anode gas is increased to the set pressure. It is therefore possible to provide a fuel cell system that can suppress the occurrence of an abnormal electric potential in a fuel cell when starting the fuel cell and also suppress damage to an electrolyte membrane.

DESCRIPTION OF SYMBOLS 1, 2 fuel cell system; 10 fuel cell; 12 hydrogen gas cylinder; 14 air compressor; 16 anode gas supply channel; 18 anode gas circulation flow path; 20 cathode gas supply channel; 22 cathode gas discharge flow path; 24 injector; 26 hydrogen compressor; 28 pressure regulating valve; 32 timer; 34 temperature sensor.

BEST MODE FOR CARRYING OUT THE INVENTION

Embodiments of the present invention are described below.

Figure 1:
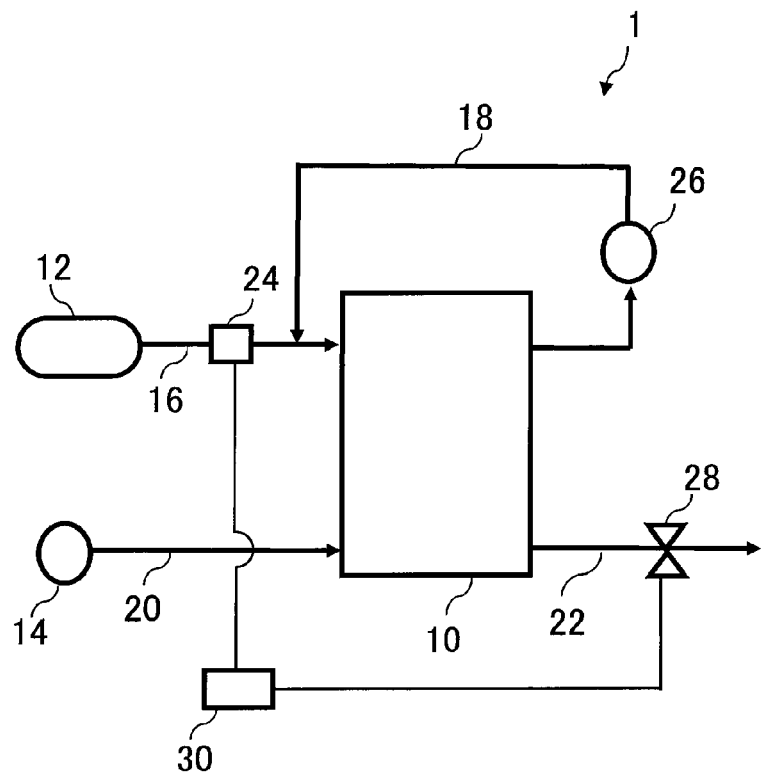
FIG. 1 is a schematic diagram that illustrates an example of the configuration of a fuel cell system according to an embodiment of the present invention.

FIG. 1 is a schematic diagram that illustrates an example of the configuration of a fuel cell system according to an embodiment of the present invention. A fuel cell system 1 includes a fuel cell 10, a hydrogen gas cylinder 12, an air compressor 14, an anode gas supply channel 16, an anode gas circulation flow path 18, a cathode gas supply channel 20, a cathode gas discharge flow path 22, an injector 24, a hydrogen compressor 26, a pressure regulating valve 28, and an ECU (Electronic Control Unit) 30.

The configuration of the fuel cell 10 used in the fuel cell system 1 of the present embodiment will now be described. A unit cell of the fuel cell 10 is a cell that includes an electrolyte membrane having hydrogen ion conductivity, an anode electrode and a cathode electrode that sandwich the electrolyte membrane therebetween, and a pair of fuel cell separators that sandwich the two outer sides of the anode electrode and the cathode electrode. The fuel cell 10 includes a stack with at least one layer of the unit cell.

The anode gas supply channel 16 is connected to an anode gas inlet (unshown) of the fuel cell 10 and an outlet (unshown) of the hydrogen gas cylinder 12. The injector 24 is provided in the anode gas supply channel 16. The anode gas circulation flow path 18 is connected to an anode gas outlet (unshown) of the fuel cell 10 and the anode gas supply channel 16. Although not particularly limited, the anode gas circulation flow path 18 is preferably connected to the anode gas supply channel 16 at a position on the downstream side of the injector 24. An anode gas (for example, hydrogen gas) supplied from the hydrogen gas cylinder 12 passes through the anode gas supply channel 16 and is supplied to the fuel cell 10 through the injector 24. An anode gas discharged from the fuel cell 10 passes through the anode gas circulation flow path 18 and is supplied again to the anode gas supply channel 16. The hydrogen compressor 26 is provided in the anode gas circulation flow path 18 to cause the anode gas inside the anode gas circulation flow path 18 to flow efficiently.

The cathode gas supply channel 20 is connected to a cathode gas inlet (unshown) of the fuel cell 10 and the exhaust port (unshown) of the air compressor 14. The cathode gas discharge flow path 22 is connected to a cathode gas outlet (unshown) of the fuel cell 10. The pressure regulating valve 28 is provided in the cathode gas discharge flow path 22. A cathode gas (for example, air) discharged from the air compressor 14 is supplied to the fuel cell 10 through the cathode gas supply channel 20. A cathode gas discharged from the fuel cell 10 passes through the cathode gas discharge flow path 22 and is discharged to the outside of the fuel cell system 1 via the pressure regulating valve 28.

The injector 24 adjusts the pressure of an anode gas supplied from the hydrogen gas cylinder 12 to the fuel cell 10 (specifically, the anode electrode), and is electrically connected to the ECU 30. The pressure regulating valve 28 adjusts the pressure of a cathode gas supplied from the air compressor 14 to the fuel cell 10 (specifically, the cathode electrode), and is electrically connected to the ECU 30. The ECU 30 principally controls the injector 24 and the pressure regulating valve 28, and sets a pressure in accordance with a gas pressure required at the fuel cell 10.

Normally, when the fuel cell 10 has been stopped, if the cathode gas supply channel 20 and the pressure regulating valve 28 are open, air enters into the cathode electrode of the fuel cell 10 from the cathode gas discharge flow path 22. In some cases the air that has entered the cathode electrode moves from the cathode electrode to the anode electrode through the electrolyte membrane. Further, a connection path is provided that connects the cathode gas supply channel 20 and the anode gas supply channel 16 on the downstream side of the injector 24, and in some cases, by supplying a cathode gas (air) to the anode electrode side, hydrogen gas inside the anode electrode is discharged and power generation in the fuel cell 10 is stopped.

Thus, when an anode gas with a gas pressure that is the same as a gas pressure during power generation is supplied when starting the fuel cell 10 in a state in which air is present in the anode electrode, the anode gas and air (oxygen) are unevenly distributed at the anode electrode. Consequently, a local battery is formed at a portion in which the anode gas is unevenly distributed, while at a portion in which air is unevenly distributed, the current flows in the opposite direction to the direction during normal power generation. As a result, the electric potential of the fuel cell 10 increases to an abnormal electric potential, and the cathode electrode or the like may be corroded.

Figure 2:
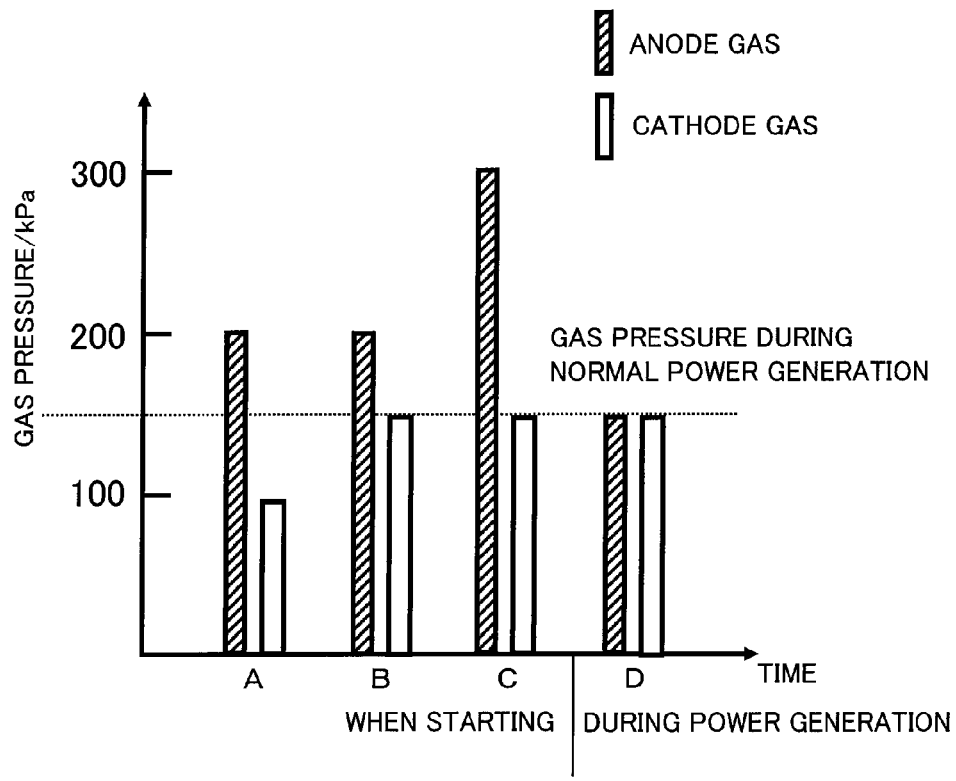
FIG. 2 is a view that illustrates an example of gas pressures that are supplied to a fuel cell when starting the fuel cell system according to the embodiments.

FIG. 2 is a view that illustrates an example of gas pressures that are supplied to the fuel cell when starting the fuel cell system according to the present embodiment. The operating method when starting the fuel cell system is described hereunder using FIG. 1 and FIG. 2. The term "when starting the fuel cell 10" as used in the present specification refers to a state from when a "start" switch of the fuel cell system 1 is pressed (for example, an ignition key is turned on) until the fuel cell system 1 is connected to an external load. Further, the term "during power generation" refers to a state in which the fuel cell system 1 is connected to an external load and is generating power. Furthermore, the term "when the fuel cell 10 is stopped" refers to a state in which the "start" switch of the fuel cell system 1 is turned off and a connection of the fuel cell system 1 with an external load has been released.

When starting the fuel cell 10, the injector 24 and the pressure regulating valve 28 are controlled by the ECU 30 shown in FIG. 1 to set the pressure of the anode gas that is supplied when starting the fuel cell 10 to a higher pressure than the pressure of the anode gas that is supplied during power generation in the fuel cell 10. Furthermore, when increasing the pressure of the anode gas to the pressure that has been set, a cathode gas pressure increase is started in accordance with the start of the anode gas pressure increase. In this case, as an example of the operating method when starting the fuel cell 10 that is described below, the pressure of the anode gas supplied during power generation in the fuel cell 10 is taken as 150 kPa, and the pressure of the anode gas supplied when starting the fuel cell 10 is taken as 300 kPa. As shown in FIG. 2, when starting the fuel cell 10, first the ECU 30 sets the gas pressure adjustment value of the injector 24 to 200 kPa, and supplies an anode gas with a pressure of 200 kPa to the fuel cell 10 (A in FIG. 2). Next, the ECU 30 sets the gas pressure adjustment value of the pressure regulating valve 28 to 150 kPa, and supplies a cathode gas with a pressure of 150 kPa to the fuel cell 10 (B in FIG. 2). Subsequently, the ECU 30 sets the gas pressure adjustment value of the injector 24 to 300 kPa, and supplies an anode gas with a pressure of 300 kPa to the fuel cell 10 (C in FIG. 2). Thereafter, together with connecting the fuel cell system 1 to an external load, the ECU 30 sets the gas pressure adjustment value of the injector 24 to 150 kPa as the pressure of the anode gas supplied during power generation in the fuel cell 10 and causes the fuel cell 10 to generate power (D in FIG. 2).

Although, according to the above described example, the pressure of the anode gas that is supplied during power generation is 150 kPa, the pressure of the anode gas that is supplied during power generation may be set to a value in a range within which a sufficient power generation reaction can be maintained and no wastage of gas occurs. Further, although the pressure of the anode gas that is supplied when starting the fuel cell 10 is taken as 300 kPa, it is sufficient to set the pressure in question to a pressure that is higher than the pressure of the anode gas supplied during power generation. Furthermore, although, according to the above described example, the pressure of the anode gas supplied when starting the fuel cell 10 is gradually increased to 300 kPa, the present invention is not limited thereto and, for example, the pressure of the anode gas supplied when starting the fuel cell 10 may be continuously maintained at 300 kPa. Further, when increasing the pressure of the anode gas to the set pressure (for example, 300 kPa), since it is sufficient to start to increase the pressure of the cathode gas in accordance with the start of the anode gas pressure increase, not only is it possible to start to increase the pressure of the cathode gas after starting to increase the pressure of the anode gas as described above, but it is also possible to start to increase the pressure of the cathode gas at the same time as starting to increase the pressure of the anode gas.

Preferably, the ECU 30 controls at least either one of the injector 24 and the pressure regulating valve 28 so that a pressure difference between the pressure of the anode gas that is supplied when starting the fuel cell 10 and the pressure of the cathode gas that is supplied when starting the fuel cell 10 does not exceed a pressure damage threshold value of an electrolyte membrane comprising the fuel cell 10. It is thereby possible to control damage to the electrolyte membrane that may occur when the fuel cell 10 is repeatedly started. Although a pressure difference between the anode gas pressure and the cathode gas pressure is 100 kPa at A in FIG. 2, is 50 kPa at B in FIG. 2, and is 150 kPa at C in FIG. 2, a pressure difference is not limited to these Values and may be another value as long as the pressure difference does not exceed the pressure damage threshold value of the electrolyte membrane. The term "pressure damage threshold value of the electrolyte membrane" refers to a threshold value for a pressure difference that does not damage an electrolyte membrane with respect to a pressure difference between an anode gas pressure and a cathode gas pressure. The pressure damage threshold value can be appropriately set according to the thickness and strength and the like of the electrolyte membrane. To ensure that the pressure difference between the pressure of the anode gas that is supplied when starting the fuel cell 10 and the pressure of the cathode gas that is supplied when starting the fuel cell 10 does not exceed the pressure damage threshold value of the electrolyte membrane, the rate at which the pressure of the anode gas is increased may be increased or decreased, or the rate at which pressure of the cathode gas is increased may be increased or decreased. It is therefore sufficient that the ECU 30 controls at least either one of the injector 24 and the pressure regulating valve 28.

Thus, according to the present embodiment, since the pressure of the anode gas supplied when starting the fuel cell is higher than the pressure of anode gas supplied during power generation in the fuel cell, air inside the anode electrode can be discharged swiftly, and uneven distribution of air can thus be controlled. Further, since a cathode gas pressure increase is started in accordance with the start of an anode gas pressure increase, it is possible to prevent the occurrence of a large difference between the anode gas pressure and the cathode gas pressure, and damage to the electrolyte membrane caused by a large pressure difference can be prevented. In particular, by controlling a difference between the pressure of the anode gas supplied to the anode electrode and the pressure of the cathode gas supplied to the cathode electrode when starting the fuel cell so that the pressure difference does not exceed the pressure damage threshold value of the electrolyte membrane, it is possible to suppress the occurrence of damage to the electrolyte membrane that is caused by repeated starting of the fuel cell.

Next, a fuel cell system according to another embodiment of the present invention is described.

Figure 3:
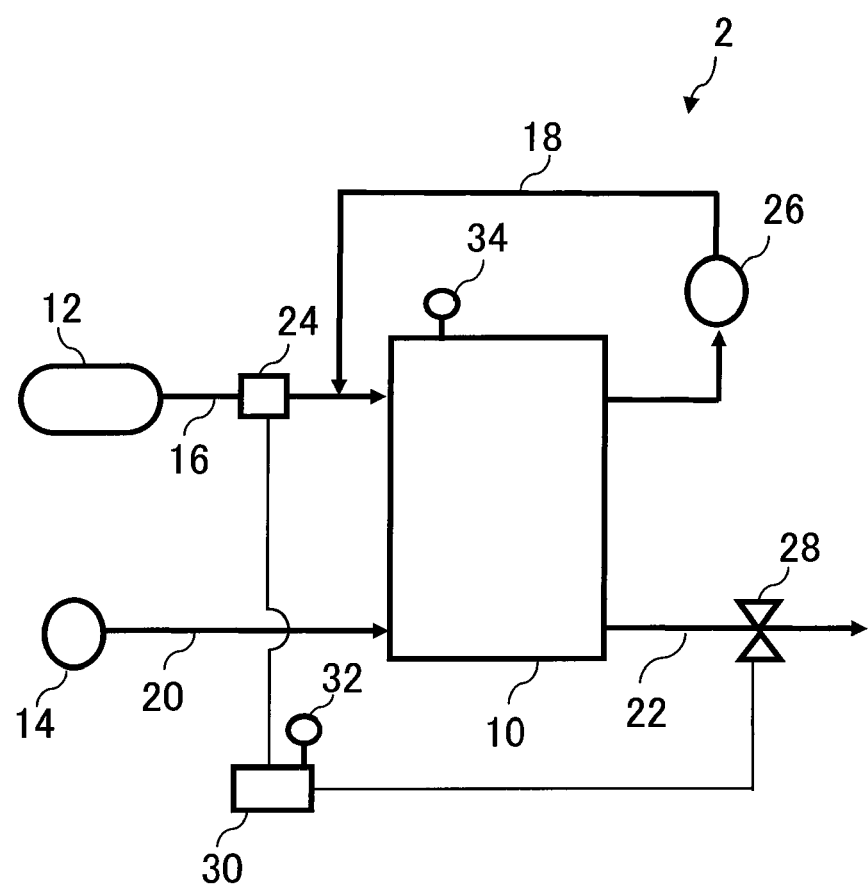
FIG. 3 is a schematic diagram that illustrates an example of the configuration of a fuel cell system according to another embodiment of the present invention.

FIG. 3 is a schematic diagram that illustrates an example of the configuration of a fuel cell system according to another embodiment of the present invention. As shown in FIG. 3, a fuel cell system 2 includes a fuel cell 10, a hydrogen gas cylinder 12, an air compressor 14, an anode gas supply channel 16, an anode gas circulation flow path 18, a cathode gas supply channel 20, a cathode gas discharge flow path 22, an injector 24, a hydrogen compressor 26, a pressure regulating valve 28, an ECU (Electronic Control Unit) 30, a timer 32, and a temperature sensor 34. Components in the fuel cell system 2 shown in FIG. 3 that are the same as those in the fuel cell system 1 shown in FIG. 1 are denoted by the same reference numbers.

The timer 32 measures a stopped time period of the fuel cell 10, and can estimate a gas amount inside the anode electrode based on the measured time period. The timer 32 is provided in the ECU 30. The term "stopped time period of the fuel cell 10" refers to a time period in which the "start" switch of the fuel cell system 2 is turned off. More specifically, the timer 32 measures a time period from when a signal indicating that the "start" switch of the fuel cell system 2 has been turned off is input to the ECU 30 until a signal indicating that the "start" switch of the fuel cell system 2 has been turned on is input. The amount of air that moves to the anode electrode from the cathode electrode when the fuel cell 10 is stopped increases together with an increase in the stopped time period of the fuel cell 10. Accordingly, for example, if a time period measured by the timer 32 is greater than or equal to a predetermined value, it is estimated that the air amount inside the anode electrode is "large", and if the time period measured by the timer 32 is less than a predetermined value, it is estimated that the air amount inside the anode electrode is "small". Further, for example, a configuration may also be adopted that estimates an air amount inside an anode electrode by applying a stopped time period of the fuel cell 10 that is measured by the timer 32 to a map that represents the relationship between air amounts inside the anode electrode and the passage of time that is previously determined by experimentation. In this connection, it is not always necessary for the estimated gas amount to be the air amount, and since the anode gas amount decreases as the air amount increases with the passage of time, the anode gas amount may be employed as the gas amount to be estimated. A ratio between the amount of air and the amount of anode gas that increases/decreases with the passage of time may also be employed as the gas amount to be estimated.

The temperature sensor 34 detects the temperature of the fuel cell 10, and can estimate a gas amount in the anode electrode based on the temperature of the fuel cell 10. The temperature sensor 34 is provided in the fuel cell 10. The temperature of the fuel cell 10 may be the surface temperature of the fuel cell 10, the internal temperature of the fuel cell 10, or the temperature of coolant inside the fuel cell 10 or the like. Since the temperature of the fuel cell 10 decreases as the stopped time period of the fuel cell 10 increases, for example, if the temperature of the fuel cell 10 that is detected by the temperature sensor 34 is less than a predetermined value, the air amount in the anode electrode that increases as the stopping time increases is estimated to be "large", and if the temperature of the fuel cell 10 is equal to or greater than a predetermined value, the air amount in the anode electrode is estimated to be "small". Further, for example, a configuration may be adopted that estimates an air amount in the anode electrode by applying a temperature of the fuel cell 10 that is measured by the temperature sensor 34 to a map that represents the relationship between air amounts in the anode electrode and temperatures of the fuel cell 10 that are previously determined by experimentation. Similarly to the case described above, it is not always necessary for the estimated gas amount to be the air amount, and since the anode gas amount decreases as the air amount increases with the passage of time, the anode gas amount may be employed as the gas amount to be estimated. A ratio between the amount of air and the amount of anode gas that increases/decreases with the passage of time may also be employed as the gas amount to be estimated.

According to the present embodiment, estimation of a gas amount in the anode electrode is not limited to estimation by the aforementioned timer 32 or temperature sensor 34. For example, an oxygen sensor may be provided on the anode electrode side of the fuel cell 10, and a gas amount (air amount) in the anode electrode may be estimated by the oxygen sensor.

The ECU 30 sets the pressure of the anode gas that is supplied when starting the fuel cell 10 in accordance with the estimated gas amount in the anode electrode. That is, the ECU 30 sets the pressure adjustment value of the injector 24 as described above. More specifically, for example, when an air amount as the gas amount in the anode electrode is estimated to be "small", since the air amount to be discharged from the anode electrode is also small, the ECU 30 sets the pressure of the anode gas that is supplied when starting the fuel cell 10 to a small pressure, for example, to the pressure of the anode gas that is supplied during power generation in the fuel cell 10. Further, for example, when an air amount as the gas amount in the anode electrode is estimated to be "large", since the air amount to be discharged from the anode electrode is also large, the ECU 30 sets the pressure of the anode gas that is supplied when starting the fuel cell 10 to a high pressure, for example, to a pressure (for example, 300 kPa) that is greater than the pressure of the anode gas that is supplied during power generation in the fuel cell 10. When increasing the pressure of the anode gas to the set pressure, as described above, the ECU 30 controls the injector 24 and the pressure regulating valve 28 so that a cathode gas pressure increase is started in accordance with the start of the anode gas pressure increase. It is thereby possible to appropriately set the pressure of the anode gas to a pressure that is necessary in order to inhibit uneven distribution of air inside the anode electrode and suppress damage to the electrolyte membrane, and also eliminate wastage of the anode gas. Further, from the viewpoint of enabling the suppression of damage to the electrolyte membrane resulting from repeatedly starting the fuel cell 10, the ECU 30 preferably controls at least either one of the injector 24 and the pressure regulating valve 28 so that a pressure difference between the pressure of the anode gas and the pressure of the cathode gas does not exceed a pressure damage threshold value of the electrolyte membrane as described above.

Although both a temperature sensor and a timer are provided according to the present embodiment, it is sufficient to provide at least either one of the temperature sensor and the timer.

INDUSTRIAL APPLICABILITY

A fuel cell system according to the above described embodiments can be used, for example, as a small size power source for a mobile device such as a portable computer, a power source for a vehicle, or a stationary power source.

The invention claimed is:

1. A fuel cell system including:
    a fuel cell that is operable in a start-up mode and a power generation mode, wherein the power generation mode includes a set pressure for an anode gas and a set pressure for a cathode gas,
    an anode gas pressure adjusting device configured to adjust a pressure of the anode gas supplied to an anode electrode of the fuel cell, and
    a cathode gas pressure adjusting device configured to adjust a pressure of the cathode gas supplied to a cathode electrode of the fuel cell;
    the fuel cell system further comprising:
    a pressure control system programmed to:
    (i) when starting the fuel cell, increase the pressure of the anode gas to a first set pressure that is higher than the pressure of the anode gas that is supplied during power generation in the fuel cell, and simultaneous with or after starting to increase the anode gas pressure, increase the pressure of the cathode gas to the set pressure of the cathode gas that is supplied during power generation in the fuel cell, wherein the set pressure of the cathode gas is lower than the first set pressure of the anode gas;

(ii) after the anode gas and the cathode gas have reached the respective set pressures, increase the pressure of the anode gas to a second set pressure that is higher than the first set pressure while maintaining the set pressure of the cathode gas; and (iii) after the anode gas has reached the second set pressure and when the fuel cell is in power generation mode, decrease the pressure of the anode gas.

2. The fuel cell system according to claim 1, wherein:

the fuel cell comprises an electrolyte membrane, and an anode electrode and a cathode electrode that sandwich the electrolyte membrane therebetween; and the pressure control system is programmed to control at least either one of the anode gas pressure adjusting device and the cathode gas pressure adjusting device so that a pressure difference between the second set pressure of an anode gas that is supplied when starting the fuel cell and the set pressure of the cathode gas that is supplied when starting the fuel cell does not exceed a pressure damage threshold value of the electrolyte membrane.

3. The fuel cell system according to claim 1, wherein the first pressure is 200 kPa, the second pressure is 300 kPa, and the pressures of the anode gas and the cathode gas supplied during power generation in the fuel cell are 150 kPa.

* * * * *

UNITED STATES PATENT AND TRADEMARK OFFICE
CERTIFICATE OF CORRECTION

| | | |
|---|---|---|
| PATENT NO. | : 8,415,063 B2 | Page 1 of 1 |
| APPLICATION NO. | : 12/747716 | |
| DATED | : April 9, 2013 | |
| INVENTOR(S) | : Orihashi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 279 days.

In the Specification:

In the section entitled Best Mode For Carrying Out The Invention, at column 6, line 10:
Delete "these Values" and insert therefor --these values--.

Signed and Sealed this
Thirteenth Day of August, 2013

Teresa Stanek Rea
*Acting Director of the United States Patent and Trademark Office*